United States Patent
Ishimura et al.

(10) Patent No.: US 8,161,274 B2
(45) Date of Patent: Apr. 17, 2012

(54) COMMAND SELECTION METHOD AND ITS APPARATUS

(75) Inventors: Naoya Ishimura, Kawasaki (JP); Hideyuki Unno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 802 days.

(21) Appl. No.: 12/199,447

(22) Filed: Aug. 27, 2008

(65) Prior Publication Data

US 2009/0064153 A1 Mar. 5, 2009

(51) Int. Cl.
*G06F 9/48* (2006.01)
*G06F 9/52* (2006.01)
*G06F 13/362* (2006.01)
*G06F 13/368* (2006.01)

(52) U.S. Cl. ......... 712/234; 712/245; 710/116; 710/123

(58) Field of Classification Search ............... 712/234, 712/245; 710/116, 123
See application file for complete search history.

(56) References Cited

U.S. PATENT DOCUMENTS

| | | | |
|---|---|---|---|
| 5,371,893 A | 12/1994 | Price et al. | |
| 5,896,539 A * | 4/1999 | Arimilli et al. | 710/244 |
| 5,937,205 A | 8/1999 | Mattson et al. | |
| 6,157,963 A * | 12/2000 | Courtright et al. | 710/5 |
| 6,304,906 B1 * | 10/2001 | Bhatti et al. | 709/227 |
| 6,658,485 B1 * | 12/2003 | Baber et al. | 719/314 |
| 2003/0088717 A1 | 5/2003 | Baas | |
| 2004/0215947 A1 * | 10/2004 | Ward et al. | 712/245 |

FOREIGN PATENT DOCUMENTS

| | | |
|---|---|---|
| JP | 2-143361 | 6/1990 |
| JP | 5-242019 | 9/1993 |
| JP | 6-119282 | 4/1994 |
| JP | 9-198264 | 7/1997 |
| JP | 10-334042 | 12/1998 |
| JP | 2005-505858 | 2/2005 |
| WO | 03/034243 A1 | 4/2003 |

OTHER PUBLICATIONS

Japanese Office Action issued May 10, 2011 in corresponding Japanese Patent Application 2008-502600.
International Search Report for PCT/JP2006/303788, mailed Jun. 6, 2006.

* cited by examiner

*Primary Examiner* — Daniel Pan
(74) *Attorney, Agent, or Firm* — Staas & Halsey LLP

(57) ABSTRACT

When selecting one command within a processor from a plurality of command queues vested with order of priority, the order of priority assigned to the plurality of command queues is dynamically changed so as to select a command, on a priority basis, from a command queue vested with a higher priority from among the plurality of command queues in accordance with the post-change order of priority.

7 Claims, 7 Drawing Sheets

CPU-LSI OVERVIEW

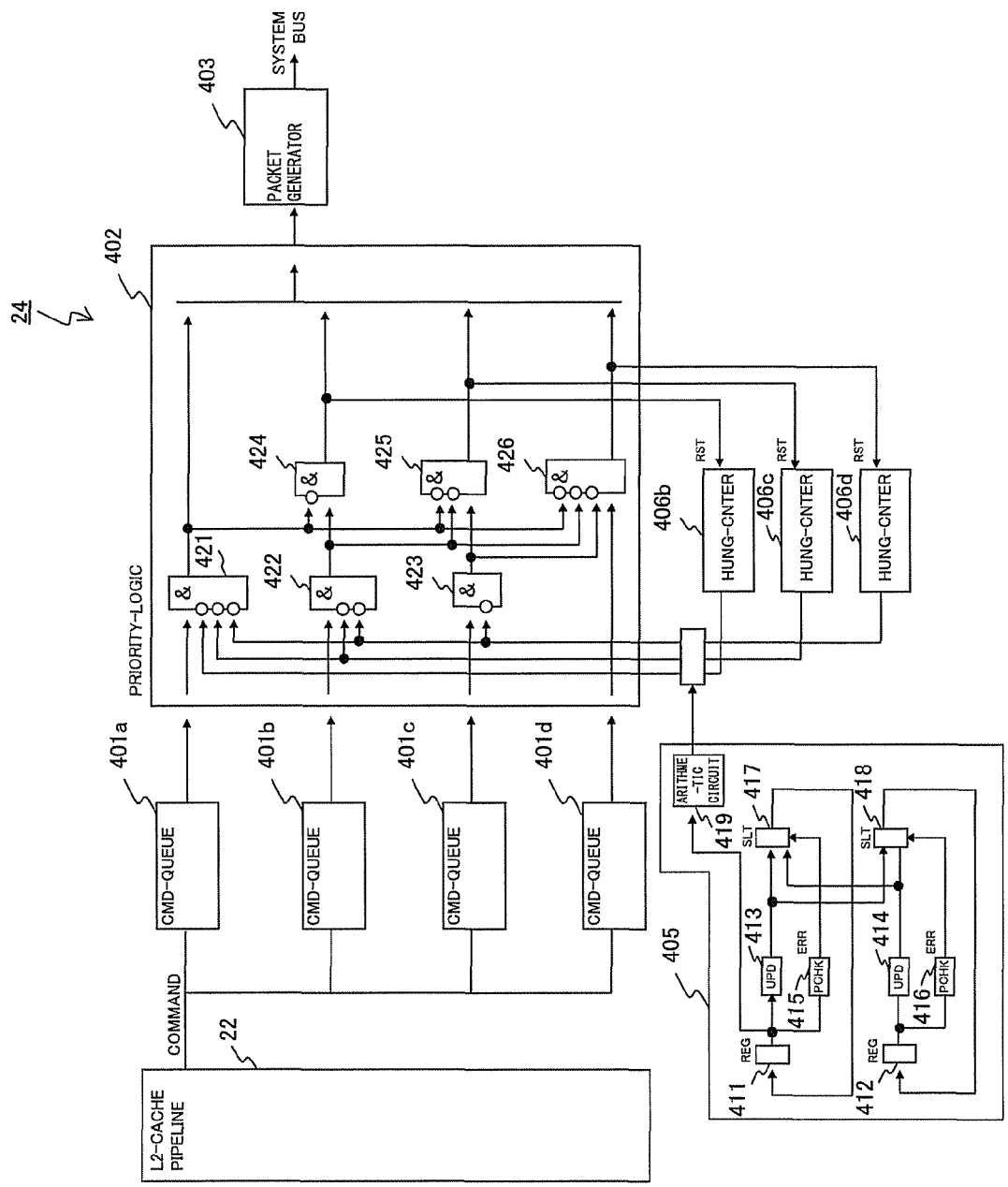
F I G. 4

COMMAND SELECTION METHOD AND ITS APPARATUS

CROSS REFERENCE TO RELATED APPLICATION

This application is based upon and claims the benefit of priority from the prior International Application No. PCT/JP2006/303788 filed on Feb. 28, 2006, the entire contents of which are incorporated herein by reference.

BACKGROUND OF THE INVENTION

1. Field of the Invention

The present invention relates a technique for enabling a processor to process a command more appropriately.

2. Description of the Related Art

In recent years, in an attempt to enable a processor to utilize resources more effectively, a priority has been given to a process target command, and a wait queue (i.e., a command queue) has been generated by classifying the commands in accordance with the priority. For example, in a multi-processor system connecting a plurality of processors, it is common to assign a high priority to a command for sending data to another processor.

The provision of commands (i.e., a command queue) with order of priority enables selecting commands existing in the queue in accordance with the order of priority. If the frequency of issuing commands having high priority increases due to this practice, it becomes difficult to select commands having lower priority. If the frequency of a clock operating a processor has a large difference from that of the clock of an external bus, or if the width of the external bus is small, a substantially large number of clocks are required to output a command externally as a request. Because of this, when selecting a command to be output externally as a request, a situation tends to arise in which it is difficult to select a command having low priority even if the frequency of issuing command having high priority is not so high.

FIG. 1 is a time chart showing commands selected by the command numbers existing respectively in two command queues vested with different priority. FIG. 1 delineates (A): a command queue having high-priority (noted as "high-priority-queue" in FIG. 1) and (B): a command queue having lower-priority (noted as "low-priority-queue" in FIG. 1). The numerical values 4 through 8 are command numbers (cmdnum), "bus-en" is the timing of starting a command output to an external bus, "rls" is a command release (i.e., elimination from the queue), and "set" is a command setting (i.e., registration in the queue). An "(A)" noted for a command (i.e., data) output to the bus shows that the queue from which the command is selected is vested with the higher priority. As such, FIG. 1 shows the commands selected from two queues and then output to the bus, focusing on only the two command queues vested with different priority.

As shown in FIG. 1, the registration of a command in the command queue can be carried out in a shorter time than the time necessary for outputting a command to the bus. Because of this, a situation tends to arise in which a large number of commands remain in the command queue. If such a situation occurs in the high-priority queue, a command is not selected from the low-priority queue for a substantially long period of time.

Even if a command is of low priority, a non-selection of the command for a long period of time may cause an impediment in the progress of the processing. Not only decreasing performance, but also a hang-up may possibly result. Considering this, the avoidance of such a situation in which a command having low priority is not selected for a long period of time is considered to be very important.

The majority of the current processors are equipped with a pipeline for speeding up the processing by shortening the wait time for a command. Commands are throw into the pipeline in order of the readiness of the command. Some commands sometimes need a re-throw (i.e., a retry). The retry is carried out due to the competition with the preceding command, the status of usable resources, and the like.

When, for example, a register storing data necessary for executing a command is accessed by executing another command, or there is a need to access the register for the execution, the access to the register is limited and so the execution of the command cannot be completed. Therefore, the command needs a retry in such a case. In order to retain information (e.g., an address value) indicating the register to which the access is to be limited, a specific-use register (i.e., a logic register) is used.

The command in need of a retry is returned to the original queue and is re-throw into the pipeline. There is a possible case in which the retried command needs another retry for a similar reason and thus the retry will be repeated.

FIG. 2 is a time chart showing the progress of command processing by means of a pipeline. The horizontal axis represents time and the vertical axis represents stages. The interval between straight lines parallel to the vertical axis represents a time equivalent to one cycle of an operating clock. The number of stages in the pipeline is eight, and the "terraced" bold lines represent the transition of stages in keeping with an elapse of time. The bold line parallel to the horizontal axis represents a period in which a certain register is locked (i.e., an access is limited) resulting from executing a command. "(A)" represents a command to be retried, while "(B1)" and "(B2)" represent other commands which are not retried.

As shown in FIG. 2, a retry is required for the command (A) due to a register being locked by the preceding command, and also in the following re-throwing, another retry is required due to registers being locked by the preceding commands (B1) and (B2). As such, if commands utilizing the same resource (e.g., a register in this case) are alternately thrown in a certain cycle, a situation results in which retry is repeated for only the same command. Even if the cycle is not constant, there is a possibility that such retry would be repeated for only the same command. Since such a retry is caused by the limitation of a usable resource, the retry has no relationship with the priority of the command. That is, even if, for example, the command (A) is selected from a higher priority queue than that in which the commands (B1) and (B2) exist, there is a possibility of repeating retries for only the command (A). Such a situation tends to occur in a multi-core processor equipped with a plurality of core units.

A repetition of retries for the same command is equivalent to not executing the command for an extended period of time. This in turn generates an obstacle in the progress of the processing, resulting in the occurrence of degraded performance and/or hang-ups, as in the case of selecting commands in accordance with the order of priority. In consideration of this, it is considered to be important to avoid the situation in which the retries are repeated for a command.

SUMMARY OF THE INVENTION

A first purpose of the present invention is to provide a technique for avoiding a situation in which a command having low priority is not selected for an extended period of time.

A second purpose of the present invention is to provide a technique for avoiding a situation in which retry (i.e., re-throw) is repeated for a command to be throw into a pipeline.

According to the present invention, a command selection method used for selecting, within a processor, one command from a plurality of command queues vested with order of priority, comprises: changing dynamically order of priority assigned to the plurality of command queues; and selecting a command from a command queue in which a higher priority exists from among the plurality of command queues, in accordance with the post-change order of priority.

Further, it is preferable that the order of priority is temporarily changed at random. Further, it is preferred that the order of priority be temporarily changed at random when a counted number of times reaches a predetermined value by counting, for each of the command queues, the number of times in which a command has not been selected continuously by other command queue. The command is preferably a command output externally to the processor as a request.

According to the present invention, a command selection apparatus, premised on being mounted on a processor for selecting one command from a plurality of command queues vested with different priority each other, comprises an order change unit for dynamically changing the order of priority assigned to the plurality of command queues; and a command selection unit for selecting a command from the plurality of command queues in accordance with a post-change order of priority if the order of priority is changed by the order change unit.

Further, the order change unit preferably counts, for each of the command queues, the number of times in which a command has not been selected continuously by other command queue, changes the order of priority temporarily when the counted number of times reaches a predetermined value, and makes the command selection unit select a command from a command queue in which the number of times has reached a predetermined value.

According to the present invention, a command throw method used for throwing a command into a pipeline process unit mounted on a processor comprises: monitoring the re-throwing of the command for each priority of the command threw into the pipeline process unit; and changing timings of throwing a command into the pipeline process unit on the basis of the monitoring result.

Further, the monitoring is preferably carried out by counting, for each priority designated to the command, the number of times in which the command has been re-throw, and the timings are changed by deterring throwing a command to the pipeline process unit for a predetermined period of time if a command of a priority of which the number of times has reached a predetermined value.

According to the present invention, a command throw apparatus, premised on being mounted on a processor for throwing a command into a pipeline process unit for performing pipeline processing, comprises: a re-throw monitoring unit for monitoring the re-throwing of a command for each priority of the command threw into the pipeline process unit; and an throw unit for changing timings of throwing a command into the pipeline process unit on the basis of a monitoring result of the re-throw monitoring unit.

The present invention is contrived to change dynamically the order of priority assigned to a plurality of command queues and to select a command therefrom in accordance with the post-change order of priority. The dynamic change of the order of priority makes it possible to select a command from a command queue of a low priority. As a result, it is possible to avoid the occurrence of a command queue existing from which a command is not selected for an extended period of time resulting from a command existing in a command queue vested with a higher priority.

The present invention is contrived to monitor the re-throwing of a command for each of the priority of the command threw into the pipeline process unit and to change temporarily and forcibly the timings of throwing a command into the pipeline process unit on the basis of the monitoring result. By changing the timings, a command for which the re-throw (i.e., the retries) have been repeated will be re-throw at timing different from the previous retry. This improves the possibility of re-throwing the command at a timing that will not cause a retry. This makes it possible to avoid continuously repeating retry.

BRIEF DESCRIPTION OF THE DRAWINGS

FIG. 4 is a diagram describing the circuit configuration of a MO-BUS controller 24;

DESCRIPTION OF THE PREFERRED EMBODIMENTS

The following is a description, in detail, of the preferred embodiment of the present invention by referring to the accompanying drawings.

Figure 3:
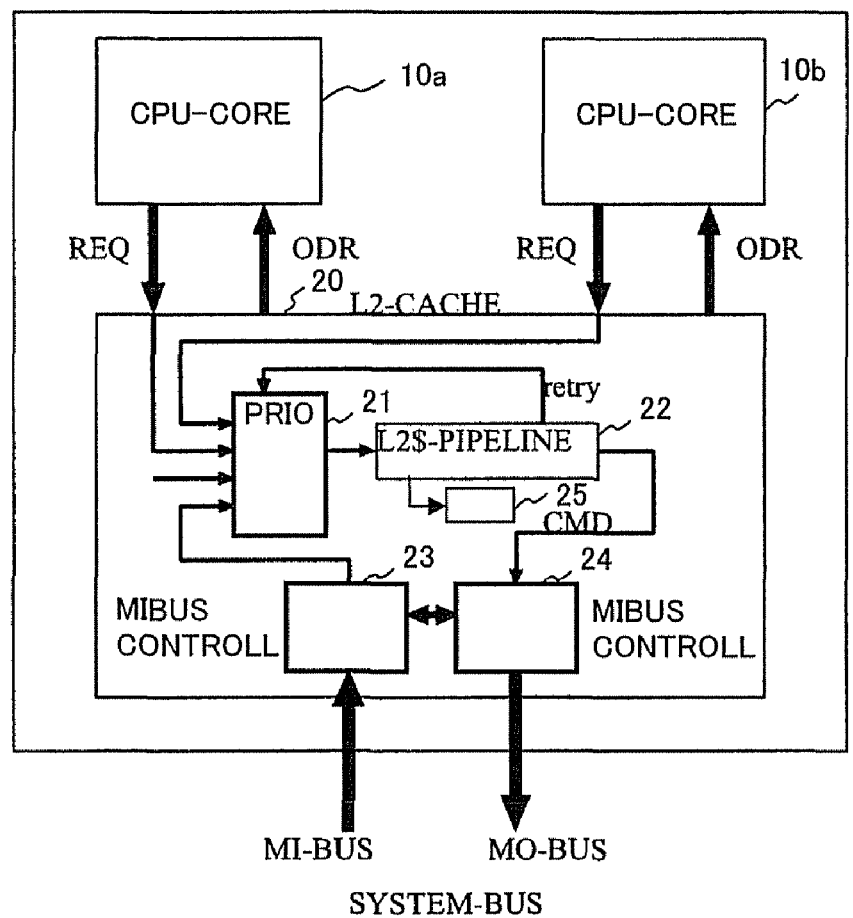
FIG. 3 is a diagram describing the configuration of a command selection apparatus, and that of a processor incorporating a command throw apparatus, according to the present embodiment.

FIG. 3 is a diagram describing the configuration of a command selection apparatus, and that of a processor incorporating a command throw apparatus, according to the present embodiment.

The processor is a multi-core processor incorporating two core units 10a and 10b which are compliant to a multi-processor system. In addition to the core units 10a and 10b, the multi-core processor comprises a secondary cache (L2-CACHE) unit 20 for exchanging commands and data with the core units 10a and 10b, as shown in FIG. 3.

The secondary cache unit 20 comprises an arbitration circuit 21, a pipeline unit 22, a moving-in (MI) BUS controller ("MI controller" hereinafter) 23, a moving-out (MO) BUS controller ("MO controller" hereinafter) 24, and a lock register cluster 25.

The arbitration circuit 21 selects a command from a plurality of command queues vested with different priority each other and throws the command into the pipeline unit 22. The pipeline unit 22 executes the command throw by the arbitration circuit 21. During the execution, the pipeline unit 22 checks whether or not a retry is necessary and, if it judges that a retry is necessary, reports the judgment to the arbitration circuit 21. Meanwhile, if there is a register in need of limiting access thereto, the information indicating the register is stored in any single lock register of the lock register cluster 25. Here, the assumption is that the information is an address value.

The MI controller 23 is for importing a command and data output to a system bus. The MO controller 24 is for outputting a command and data to the system bus. The command selection apparatus according to the present embodiment is implemented on the MO controller 24, and the command throw apparatus is implemented as the arbitration circuit 21.

FIG. 4 is a diagram describing the circuit configuration of the MO controller 24.

The MO controller 24 comprises four buffers 401a through 401d for storing command queues. With this configuration, a command output as the execution result of the pipeline unit 22 is stored in any of the buffers 401 in accordance with the priority. The commands stored in the respective buffers 401a through 401d are extracted in a first-in first-out (FIFO) scheme. Here, it is assumed of the order of priority of command queues stored in the respective buffers 401a through 401d that the higher in the drawn positions the higher in priority. In accordance with this assumption, the command queue stored in the buffer 401a has the highest priority.

A command selection (PRIORITY-LOGIC) unit 402 receives, as throws, commands from the respective buffer 401a through 401d, selects one of the commands, and outputs it to a packet generator 403, which then shapes the input command into a prescribed packet format and outputs it.

A random number generation unit 405 is for generating random numbers in a pseudo manner and outputting a signal in accordance with the random number value. Three hung counters 406, i.e., hung counters 406b through 406d, are for counting the number of times in which a command has not been selected even though it exists in the corresponding command queues. The suffixes "a" through "d" of the component signs are attached to simplify understanding of the correspondences. With this, a command queue-use hung counter 406 of the buffer 401b is vested with the component sign "406b". The reason for a command queue-use hung counter of the buffer 401a not existing is that the priority of the queue is the highest. The individual counters 406b through 406d respectively output high (H) signals when the count values reach a predetermined value.

The command read from the buffer 401a is input into an AND ("&") gate 421 as is. The signals of the respective counters 406b through 406d are inverted and input. With this configuration, the command is selected under the condition that the signals output from the respective counters 406b through 406d are low (L).

There is a number of AND gates 421 that is equivalent to the number of bits for inputting commands. Here, however, this fact is ignored in order to avoid confusion, unless specifically mentioned.

A command read from the buffer 401b is input into an AND gate 422 as is. The signals of the respective counters 406c and 406d (e.g., carry-bit signals) are inverted and input. Therefore, the command is output from the AND gate 422 if the signals output from the respective counters 406c and 406d are L.

A command read from the buffer 401c is input into an AND gate 423 as is. The signal of the counter 406d is inverted and input. Therefore, the command is output from the AND gate 422 if the signal of the counter 406d is L.

A command read from the buffer 401d is input into an AND gate 426 as is. The respective output signal of the AND gates 421, 422 and 423 are inverted and input into the AND gate 426. Therefore, the command is output from the AND gate 426 if the respective output signals of the AND gates 421, 422 and 423 are all L.

The signal of the hung counter 406d is inverted and input into the AND gates 421, 422 and 423. Therefore, when the signal of the counter 406d becomes H, the command read from the buffer 401d is selected and output to the packet generator 403. The selection causes the counter 406d to be reset (RST).

The output signal of the AND gate 423 is input into an AND gate 425. The output signals of the AND gates 421 and 422 are inverted and input into the AND gate 425. Therefore, if the respective output signals of the AND gates 421 and 422 are both L, the output signal of the AND gate 423 is output from the AND gate 425 as is.

The output signal of the counter 406d inverted/input into the AND gate 423 is inverted/input into the AND gates 421 and 422, respectively. The output signal of the counter 406c is inverted/input also into the AND gates 421 and 422. Therefore, under the condition of the output signal of the counter 406d being L and that of the output signal of the counter 406c being H, the command read from the buffer 401c is selected, that is, the aforementioned command is output from the AND gate 425, and then input into the packet generator 403.

The output signal of the AND gate 422 is input into an AND gate 424. The output signal of the AND gate 421 is inverted/input into the AND gate 424. Therefore, if the output of the AND gate 421 is L, the output signal of the AND gate 422 is output from the AND gate 424 as is.

The output signal of the counter 406d inverted/input into the AND gate 422 is inverted/input into the AND gates 421 and 423, respectively. The output signal of the inverted/input counter 406c is inverted/input into the AND gate 421. Therefore, under the condition of the respective output signals of the counters 406c and 406d being both L and that of the output signal of the counter 406b being H, the command read from the buffer 401b is selected, that is, the aforementioned command is output from the AND gate 424 and then input into the packet generator 403.

The counts on the individual counters 406b through 406d are respectively increased if the commands read from the corresponding buffers 401 are not selected. That is, for example, the count on the counter 406b is increased if a command read from the buffer 401b exists and yet the command is not output from the AND gate 424. Therefore, an alternative configuration may be to calculate both the logic sum of each bit of a command read from, for example, the buffer 401b and the logic sum of the individual output signals of the AND gate 424, and to output, to the counter 406b, a signal obtained by calculating the exclusive logic sum of the aforementioned two logic sums as the signal for an increase in the count. The value of the exclusive logic sum becomes "1" (H) only if the command is not selected. In the meantime, for a reset-use signal, it may be appropriate to output a signal obtained by calculating the logic sum of the individual output signals of the AND gate 424. The value becomes "1" (H) only if the command is selected. Resetting by way of such a signal causes the command queue stored in the buffer 401b to be temporarily and only once placed in the highest priority. The situation is similar for the other counters 406c and 406d.

As such, the present embodiment is configured to count the number of times in which a command is not selected continuously for each command queue other than the command queue vested with the highest priority and to change the priority of the corresponding command queue to the highest when the counted number of times reaches a predetermined value, thereby improving the possibility of the command being selected. It is therefore possible to reliably avoid the occurrence of a situation in which a command is not selected from a command queue with which a command queue vested with a higher priority co-exists for an extended period of time. As a result, it is also possible to reliably avoid a degradation of performance and the occurrence of hang-ups due to the occurrence of the aforementioned situation.

Figure 6:
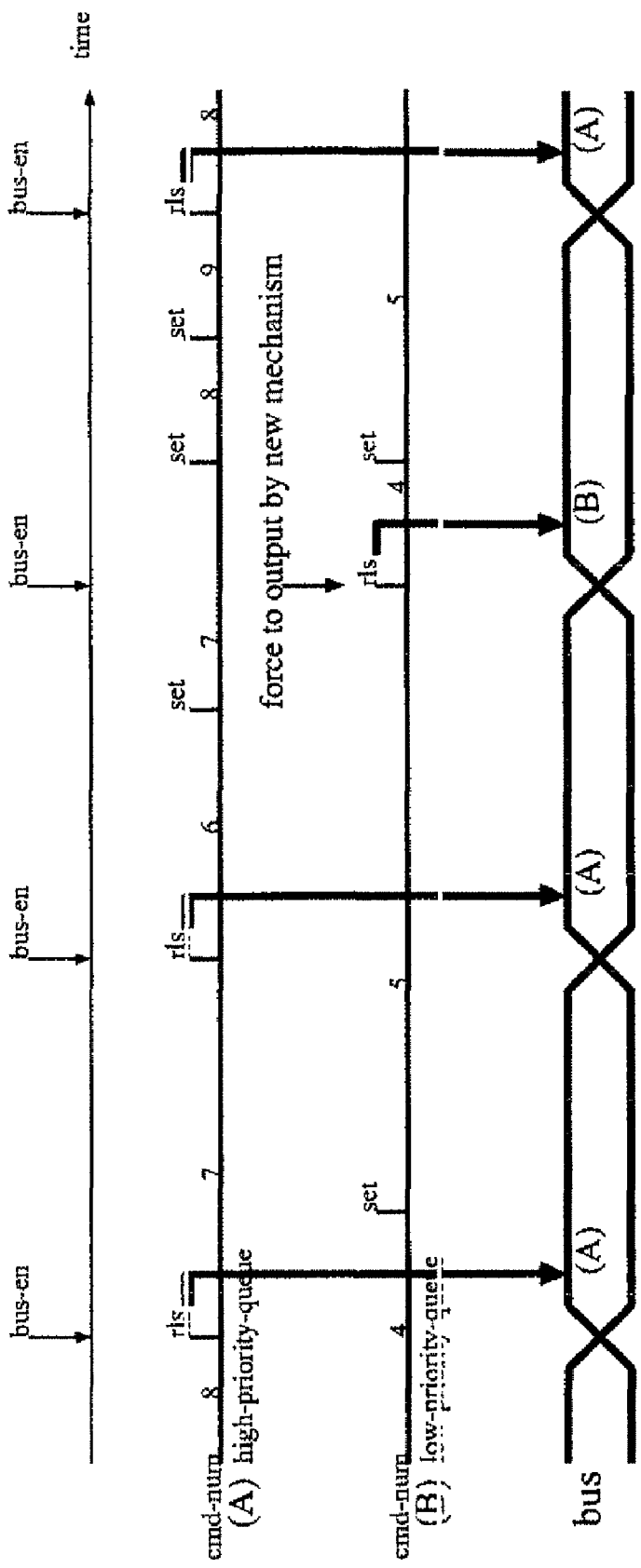
FIG. 6 is a time chart showing commands selected from two command queues vested with different priority each other.

FIG. 6 is a time chart showing commands selected from two command queues vested with different priority each other. FIG. 6 shows commands selected under the same condition as that of FIG. 1 for an easy comparison with the case of FIG. 1.

Figure 1:
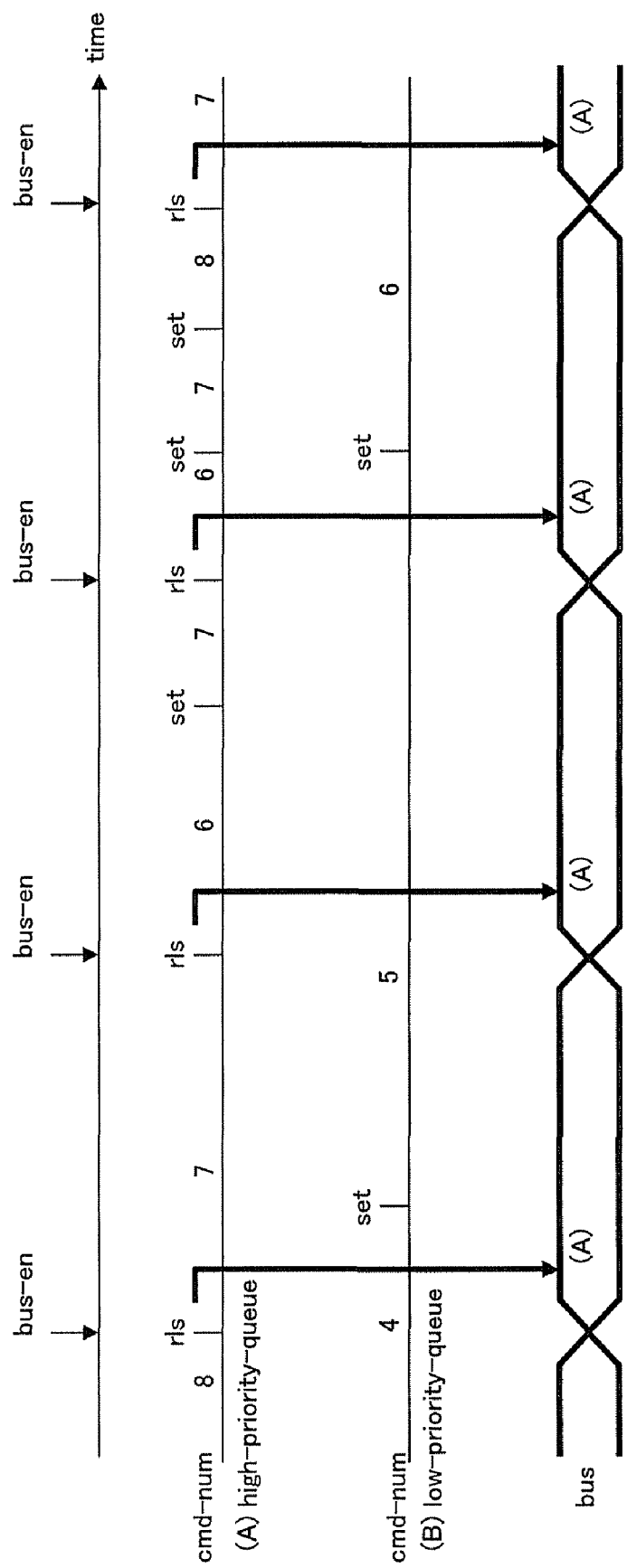
FIG. 1 is a time chart showing commands selected by the command numbers existing respectively in two command queues vested with different priority each other.
Figure 2:
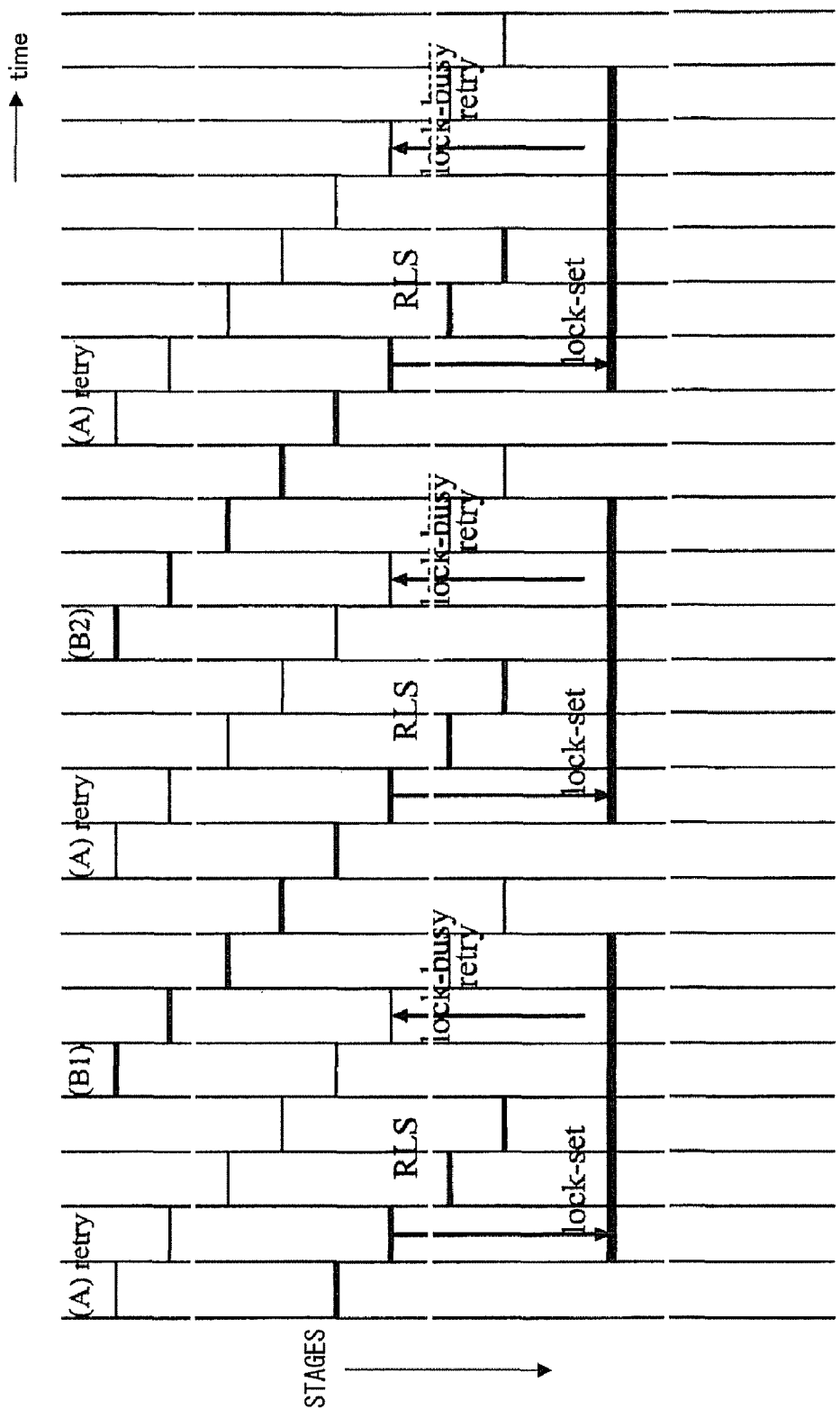
FIG. 2 is a time chart showing the progress of command processing by means of a pipeline.

Under the above conditions, the commands in the command queue (A) are conventionally selected in succession as shown in FIG. 1. Moving up the priority of the command queue (B) temporarily selects a command in the command queue (B) once under the situation shown in FIG. 6.

As described above, the present embodiment is configured to move up the priority of any one of the command queues stored in the buffers 401b through 401d temporarily only once. The reason for the configuration is to avoid an occurrence of another adverse effect stemming from not carrying out the processing of a command that originally had a higher priority in the order of priority. Because of this, as for changing the priority of a command that was originally high in the order of priority, it is not preferable to adopt a method such as, for example, carrying out for an extended period of time in a certain cycle or until a predetermined condition is satisfied.

Changing the order of priority temporarily using the counters 406b through 406d is carried out to reliably avoid a situation in which a command of a certain command queue is not selected for an extended period of time. The present embodiment is configured to perform a temporary change of the order of priority at random so that such a situation will not continue. The random number generation unit 405 is equipped for this purpose.

As shown in FIG. 4, the random number generation unit 405 comprises two registers 411 and 412; two update units 413 and 414 for updating the random number values by means of a recurrence equation of the linear congruential method; two check units 415 and 416; two selectors 417 and 418; and an arithmetic circuit 419.

The registers 411 and 412 each possess, for example, 8 bits for retaining data and 1 bit for a parity check. Both of these bits are used for retaining a random number. While a value to be retained as an initial value is arbitrary; a logic CPU number transmitted from the system side in a constant cycle may be retained as the initial value in a multi-processor system.

The random number retained in the register 411 is output to the update unit 413 and check unit 415. The selector 417 receives, as inputs, post-update random numbers from the update units 413 and 414, respectively, then selects one of the input numbers and outputs it in accordance with the signal output from the check unit 415. If a parity error is detected by performing a check, the check unit 415 causes, for example, a signal to be active and selects a random number input from the update unit 414. The output random number is retained by the register 411.

Meanwhile, the random number retained in the register 412 is output to the update unit 414 and check unit 416. The selector 418 receives, as inputs, post-update random numbers from the update units 413 and 414, respectively, and selects one of them and outputs it in accordance with the signal output from the check unit 416. If a parity error is detected by performing a check, the check unit 416 causes, for example, a signal to be active and selects a random number input from the update unit 413. The output random number is retained by the register 412. This makes it possible to avoid the influence of a parity error.

The arithmetic circuit 419 receives, as an input, a random number value retained in the register 411 and outputs a signal to the wires respectively connected to the individual counters 406b through 406d in accordance with the random number value. The signal output to the wires respectively connected to the individual counters 406b through 406d is handled as H in the case of the following random number value. Here, a random number value expressed by 8 bits is described as R(i) (where i=7 through 0, and "7" is equivalent to the highest bit).

The signal output to the wire that is connected to the counter 406b is handled as H when R(7)=1&R(6)=1&R(5)=0. The signal output to the wire connected to the counter 406c is handled as H when R(7)=1&R(6)=1&R(5)=1&R(4)=0. The signal output to the wire connected to the counter 406d is handled as H when R(7)=1&R(6)=1&R(5)=1&R(4)=1.

All of the signals output under the conditions as described above become H, or so does only one of them. Therefore, the configuration is such that only one command from the command queues stored in the respective buffers 401b through 401d can be selected when changing order of priority.

Figure 5:
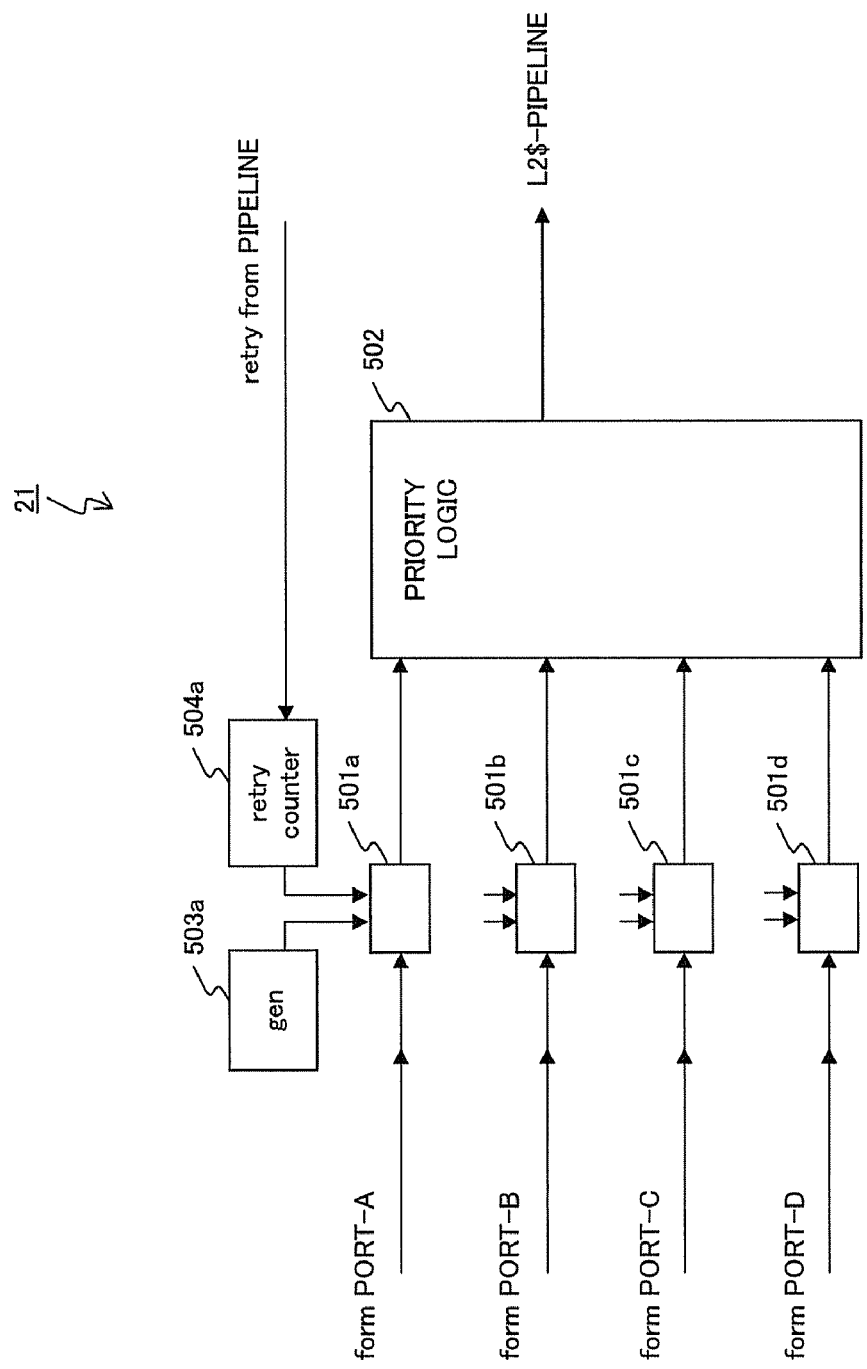
FIG. 5 is a diagram describing the circuit configuration of an arbitration circuit 21.

FIG. 5 is a diagram describing the circuit configuration of the arbitration circuit 21. Next is a description of the circuit configuration and operation thereof in detail by referring to FIG. 5. The arbitration circuit 21 is for selecting a command from a plurality of command queues vested with different priority each other and inputting the command into the pipeline unit 22 as described above.

The commands to be thrown into the pipeline unit 22 are categorized in accordance with the corresponding priority and inputs from any of ports A through D. The respective ports A through D are provided with four adjustment circuits 501 (i.e., 501a through 501d) so that a command from port A is input into the adjustment circuit 502a. Likewise, the respective commands from ports B, C and D are input into the adjustment circuits 501b, 501c and 501d, respectively. Suffixing "a" through "d" onto the component signs makes it easy to grasp the correlation between the ports and adjustment circuits 502. Also, in this case, the assumption is that the higher the position in the drawing, the higher the priority of the command. In accordance with this assumption, a command from port A is of the highest priority. For example, the command from port A is in accordance with the response from the core unit 10a or 10b responding to a request from the system (i.e., the platform) side. The command from port B is related to a request from the system side, the command from port C is related to a new request from either the core unit 10a or 10b, and the command from port D is related to a speculative fetch from either the core unit 10a or 10b.

The individual adjustment circuits 501 output the input commands to a command selection (PRIORITY-LOGIC) unit 502, respectively. Receiving commands from the plurality of adjustment circuits 501 as the respective inputs, the command selection unit 502 selects one command from among the received commands in accordance with a predetermined order of priority and outputs the selected command to the pipeline unit 22.

A retry counter 504 connected to the adjustment circuit 501a is for counting the number of times in which the retries of a command from port A have occurred after it has been throw into the pipeline unit 22. A wait time generation unit 503a is for designating a wait time to delay the timing of outputting a command from the adjustment circuit 502a to the command selection unit 502.

The retry counter 504a is for outputting an H signal (e.g., a carry bit signal) when the count value reaches a predetermined value, as with the individual counters 406 shown in FIG. 4.

When the signal becomes H, the adjustment circuit 501a delays a timing of outputting a command to the command selection unit 502 for a period of time specified by the wait time generation unit 503a. With this configuration, the timing of the command selection unit 502 selecting and throwing the command is delayed from the original timing.

The corresponding retry counter 504 and wait time generation unit 503 also exist at another port, although they are not specifically shown in a drawing. This configuration enables the other adjustment circuits 501b through 502d to operate in a similar manner.

Figure 7:
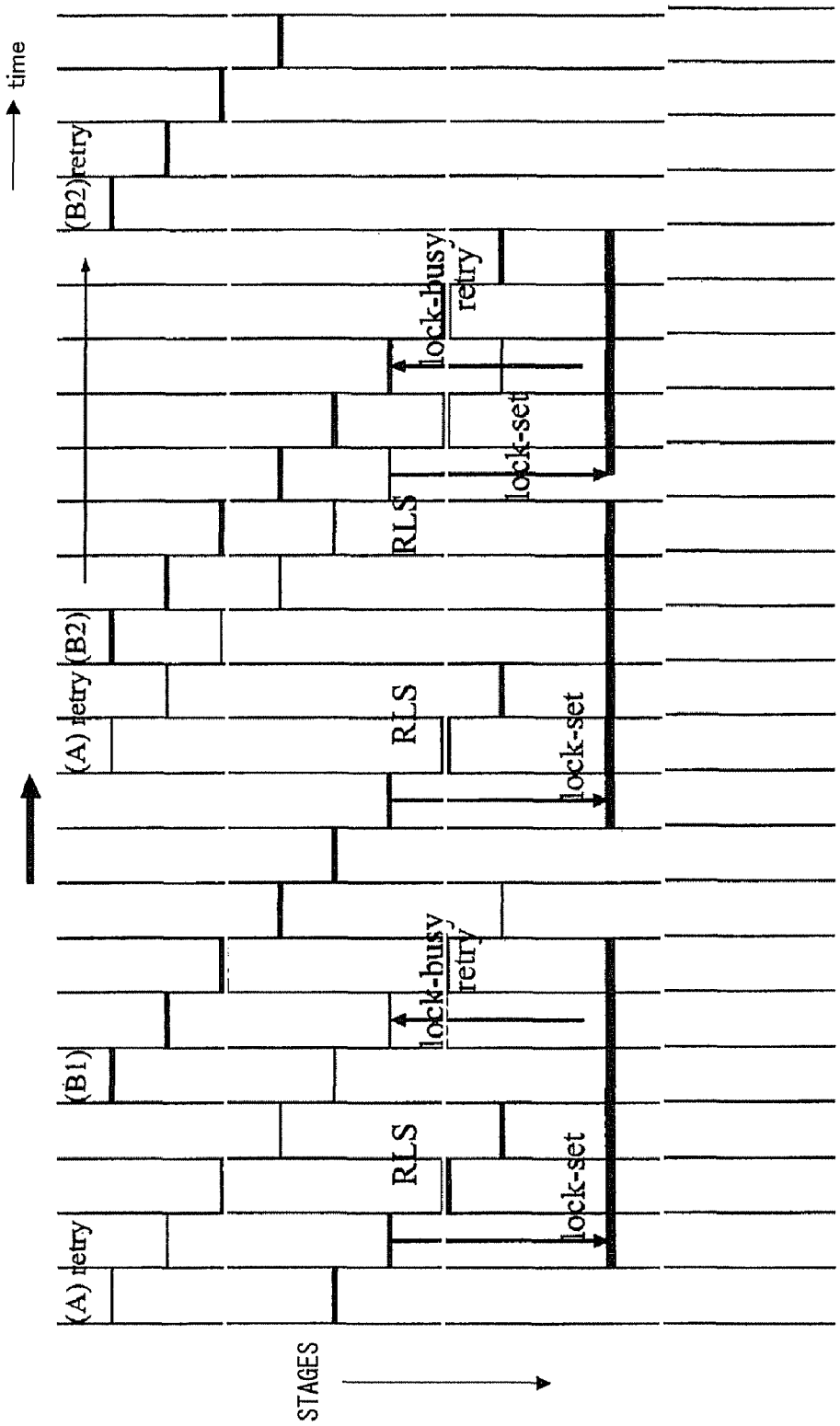
FIG. 7 is a time chart showing commands throw into a pipeline unit 22 and the progress of the command processing.

FIG. 7 is a time chart showing the commands throw into the pipeline unit 22 and the progress of the command processing. FIG. 7 shows the commands throw in the same situation as in FIG. 1 to make it easy to compare with FIG. 7.

FIG. 7 shows the case of delaying the timing of re-throwing a command (A) needing a retry for two cycles of an operating clock. This delay enables the re-threw command (A) to complete the processing. This in turn causes the subsequently threw command (B2) to require retry and is thus actually re-throw.

As such, forcibly delaying the re-throwing timing of a command that has become a subject of a retry and then become retry-enabled makes it possible to avoid continuous repetition of the retries for the command. There is a possibility that the order of threw commands will be changed by the delay. It is possible to avoid continuous repetition of retries by changing the order. The delayed time (i.e., the wait time forcibly generated) is preferably set to be between one cycle time on the operating clock and a time that is the aforementioned cycle time multiplied by two times the length (i.e., the number of stages) of the pipeline.

Note that the present embodiment is configured to delay the re-throwing timing of a command for each port; the configuration is created to limit the reduction in the number of commands to be processed by reducing the influence to other ports as much as possible. It is, however, possible to avoid continuous repetition of retries for the same command by delaying the re-throwing timing, and therefore a wait time may be generated in the all of the ports. Further, in the case of avoiding only continuous repetition of retries for the same command, a corresponding retry counter 504 may be reset, provided that the retry does not occur for a prescribed period of time.

Note that a target for incorporating the command selection apparatus or command throw apparatus may be an application-specific integrated circuit (ASIC) or the like.

What is claimed is:

1. A command selecting method for a processor that selects, a command from a plurality of command queues each of which vested with priority order, the command selecting method comprising:
counting a number of times for each of the plurality of command queues in which a command has not been selected successively other than a command queue vested with higher priority order;
changing priority order of a command queue of which counted number of times reaches a predetermined value to higher priority order; and
selecting a command from a command queue in which the higher priority order is vested from the plurality of command queues in accordance with the changed priority order.

2. The command selecting method according to claim 1, wherein
the priority order is changed at random.

3. The command selecting method according to claim 1, wherein
the command is a request command outputted to external of the processor.

4. A command selecting apparatus included in a processor for selecting a command from a plurality of command queues each of which vested with priority order, the command selecting apparatus comprising:
a counting unit that counts a number of times for each of the plurality of command queues in which a command has not been selected successively other than a command queue vested with higher priority order;
a priority order changing unit that changes priority order of a command queue of which counted number of times reaches a predetermined value to higher priority order; and
a command selecting unit that selects a command queue in which the higher priority order is vested from the plurality of command queues in accordance with the changed priority order.

5. The command selecting method according to claim 1 further comprising:
monitoring reissuing of a command for each priority order of the command issued into a pipeline of the processor; and
changing timings of issuing the command into the pipeline on the basis of monitoring result of the monitoring.

6. The command selecting method according to claim 5, wherein
the monitoring is carried out by counting, a number of times in which a command has been reissued for each priority order designated to the command, and
the timings are changed by deterring issuing a command to the pipeline for a predetermined period of time when a command of a priority order of which the counted number of times has reached a predetermined value.

7. The command selecting apparatus according to claim 4 further comprising:
a monitoring unit that monitors reissuing of a command for each priority order of the commands issued into a pipeline of the processor; and
an issue unit that changes timings of issuing the command into the pipeline on the basis of monitoring result of the monitoring unit.

* * * * *

UNITED STATES PATENT AND TRADEMARK OFFICE
CERTIFICATE OF CORRECTION

PATENT NO. : 8,161,274 B2
APPLICATION NO. : 12/199447
DATED : April 17, 2012
INVENTOR(S) : Naoya Ishimura et al.

Page 1 of 1

It is certified that error appears in the above-identified patent and that said Letters Patent is hereby corrected as shown below:

Title Page, Column 1, After
(65)                        Prior Publication Data

US 2009/0064153 A1    Mar. 5, 2009 please insert              -- Related U.S. Application Data

(63) Continuation of application No. PCT/JP2006/303788, filed on February 28, 2006. --

Column 10, Line 41 (Approx.), In Claim 6, delete "counting," and insert -- counting --, therefor.

Signed and Sealed this
Tenth Day of July, 2012

David J. Kappos
*Director of the United States Patent and Trademark Office*